United States Patent [19]

Clenet

[11] Patent Number: 5,081,912
[45] Date of Patent: Jan. 21, 1992

[54] VEHICLE VENT

[75] Inventor: Alain J-M. Clenet, Santa Barbara, Calif.

[73] Assignee: Asha Corporation, Santa Barbara, Calif.

[21] Appl. No.: 650,929

[22] Filed: Feb. 5, 1991

[51] Int. Cl.$^5$ ............................................. B60H 1/26
[52] U.S. Cl. ...................... 454/136; 114/212; 454/147; 454/162; 454/900
[58] Field of Search ................ 87/2.02, 2.14, 2.17, 87/2.18, 900; 114/212

[56] References Cited

U.S. PATENT DOCUMENTS

| 2,104,088 | 1/1938 | Lyman . | |
|---|---|---|---|
| 3,680,467 | 8/1972 | Brock | 98/2.11 |
| 4,535,715 | 8/1985 | McIntosh | 114/212 X |
| 4,558,634 | 12/1985 | Oshiro et al. | 98/2.18 |
| 4,592,296 | 6/1986 | Lamparter | 98/2.14 |
| 4,658,597 | 4/1987 | Shum | 62/235.1 |
| 4,741,256 | 5/1988 | Huang | 98/2.14 |
| 4,800,803 | 1/1989 | Farmont | 98/2.14 |
| 4,804,140 | 2/1989 | Cantrell | 98/2.18 X |
| 5,003,866 | 4/1991 | Ricci | 98/2.14 X |

FOREIGN PATENT DOCUMENTS 1346 of 1896 United Kingdom ................ 114/212

Primary Examiner—Harold Joyce
Attorney, Agent, or Firm—Brooks & Kushman

[57] ABSTRACT

A vehicle vent (12) for exhausting air from a vehicle occupant compartment includes a float valve (32) that prevents water that enters an outlet (24) of the vent from passing into the vehicle through the vent inlet (20) but which has a drain passage (36) for permitting a limited flow of the water to a drain (38) on the vent inlet side of the float valve (32). The vent (12) preferably includes a fan (40) that is most preferably energized by a solar panel (48). Mounting of the vent (12) can be provided on the vehicle roof, on the roof just forward of a vehicle back window, or as part of a sunroof.

14 Claims, 4 Drawing Sheets

VEHICLE VENT

TECHNICAL FIELD

This invention relates to a vehicle vent for exhausting air from a vehicle occupant compartment to the environment.

BACKGROUND ART

When vehicles are parked in hot weather, an excessively high temperature can build up in the vehicle occupant compartment and thus cause discomfort when the occupant initially enters the vehicle as well as causing deterioration of the vehicle interior components. This heating of parked vehicles is a particular problem with current vehicles that utilize a greater amount of glass for the windshield, side windows and back window as compared with earlier vehicles. Various forms of solar operated roof vents have previously been proposed so as to function effectively, such as shown by U.S. Pat. Nos. 2,104,088 Lyman; 3,680,467 Brock; 4,558,634 Oshiro et al; 4,592,269 Lamparter; 4,658,597 Shum; 4,741,256 Huang; 4,804,140 Cantrell; and 4,800,803 Farmont.

One problem that is common to vehicle vents is that the vent must prevent the entry of water into the vehicle. Since vehicle vents for exhausting air are most advantageously positioned at the vehicle roof where the air temperature is highest, this water exclusion requirement is a particular problem due to the exposed condition of the vent at the roof location.

SUMMARY OF INVENTION

An object of the present invention is to provide an improved vehicle vent for exhausting air from a vehicle occupant compartment to the environment while nevertheless preventing water from entering the vehicle occupant compartment.

In carrying out the above object and other objects of the invention, the vehicle vent for exhausting air from the vehicle occupant compartment to the environment includes a housing having an inlet through which air enters the vent from the vehicle occupant compartment and also has an outlet through which the air exits the vent to the environment. This housing has a divider that defines an upper opening through which the air flows from the inlet to the outlet. A float valve of the vent is movable between open and closed positions with respect to the upper opening of the divider. The housing defines a collection chamber located toward the outlet from the divider such that water entering the vent from the environment accumulates in the collection chamber to close the float valve. The housing has at least one lower drain passage that extends from the collection chamber through the divider to a location toward the inlet from the divider such that water can flow therethrough at a limited rate even when the float valve is closed. The housing also has a drain located on the side of the divider toward the inlet so as to receive water from the drain passage for draining from the vent to the ground.

In its preferred construction, the vehicle vent also includes a fan for drawing air from the vehicle occupant compartment through the vent for exhaustion to the environment. The vent also preferably includes a solar panel for energizing the fan such that operation thereof can take place without any drain on the battery when the vehicle is parked in the sun.

In the preferred construction of the vehicle vent disclosed, the float valve includes a buoyant valve body and a lower pivotal connection that pivotally mounts the buoyant valve body on the housing for movement between the open and closed positions with respect to the divider opening through which the air flows. This buoyant valve body most preferably has an enlarged buoyant portion adjacent the pivotal connection and also has a smaller distal end. The buoyant valve body has a flat side that seals with the divider and a curved side that cooperates with the flat side to define the enlarged buoyant portion and the smaller distal end. The vent may also include a counterbalance located on the opposite side of the pivotal connection from the buoyant valve body. It is also possible for the float valve to include a thermally responsive spring that maintains the float valve body in the closed position at lower temperatures.

The vehicle vent functions effectively on the vehicle roof and most preferably includes a peripheral flange for mounting the vent on the vehicle roof. As previously mentioned, the vent preferably includes a solar panel, which in one embodiment is located just forwardly of a vehicle back window and in another embodiment is a component of a vehicle sunroof.

The objects, features and advantages of the present invention are readily apparent from the following detailed description of the best modes for carrying out the invention when taken in connection with accompanying drawings.

BEST MODES FOR CARRYING OUT THE INVENTION

Figure 1:
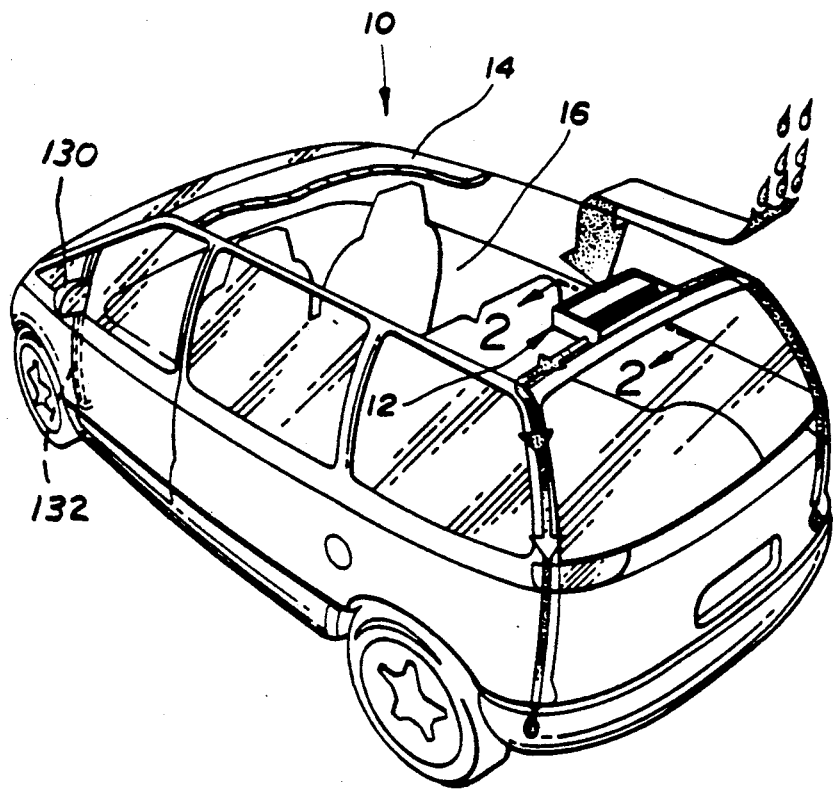
FIG. 1 is perspective view of a vehicle including a vent constructed in accordance with the present invention to exhaust air from the vehicle occupant compartment to the environment.

With reference to FIG. 1 of the drawings, a vehicle generally indicated by 10 is illustrated as being of the van type and has a vent 12 that is constructed in accordance with the present invention and mounted on the vehicle roof 14 just forward of a back window 15 and at the upper extremity of the occupant compartment 16.

As is hereinafter more fully described, the vent 12 operates to exhaust air from the occupant compartment 16 while preventing water from entering the occupant compartment as is hereinafter more fully described by causing the water that enters the vent to drain to the ground as shown by the arrows.

Figure 2:
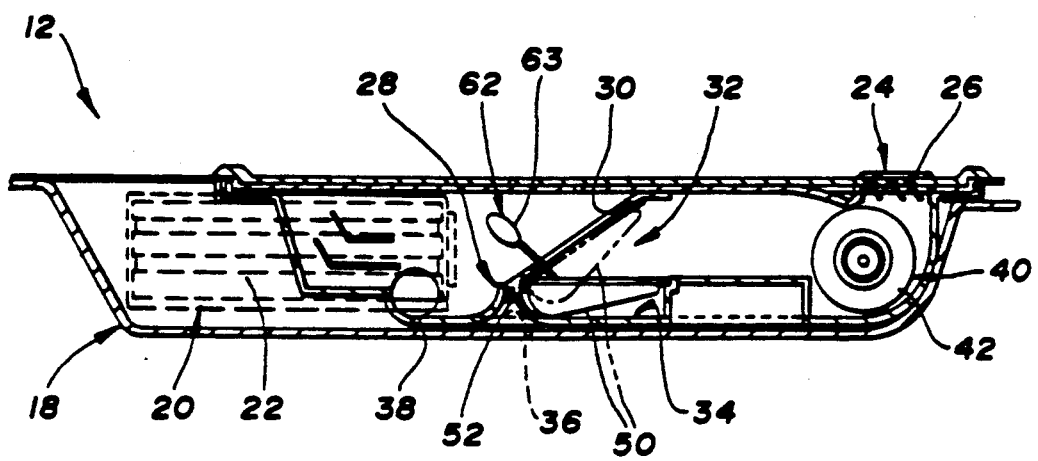
FIG. 2 is a cross-sectional view taken on an enlarged scale through the vent along the direction of line 2—2 in FIG. 1.

With reference to FIG. 2, the vent 12 includes a housing 18 having an inlet 20 provided by an inlet grill 22 through which air enters the vent from the vehicle occupant compartment. An outlet 24 of the vent is provided by an outlet grill 26 through which the air exits from the vent to the environment. The housing 18 includes a divider 28 that defines an upper opening 30 through which the air flows from the inlet 20 to the outlet 24. A float valve 32 of the vent is movable between the open position shown by solid line representation and the closed position shown by phantom line representation with respect to the upper opening 30 of the divider. Just to the right of the float valve 32, the housing 18 defines a collection chamber 34 located toward the outlet 24 from the divider 28 such that any water that enters the vent from the environment accumulates in the collection chamber to close the float valve. Housing 18 includes at least one lower drain passage 36 that extends from the collection chamber 34 through the divider 28 to a location toward the inlet 20 from the divider such that water can flow therethrough at a limited rate even when the float valve 32 is closed. A drain 38 of the housing is located to the left of the divider 28 as shown in FIG. 2 on the side thereof toward the inlet 20 so as to receive water from the drain passage 36 for draining from the vent to the ground.

Figure 3:
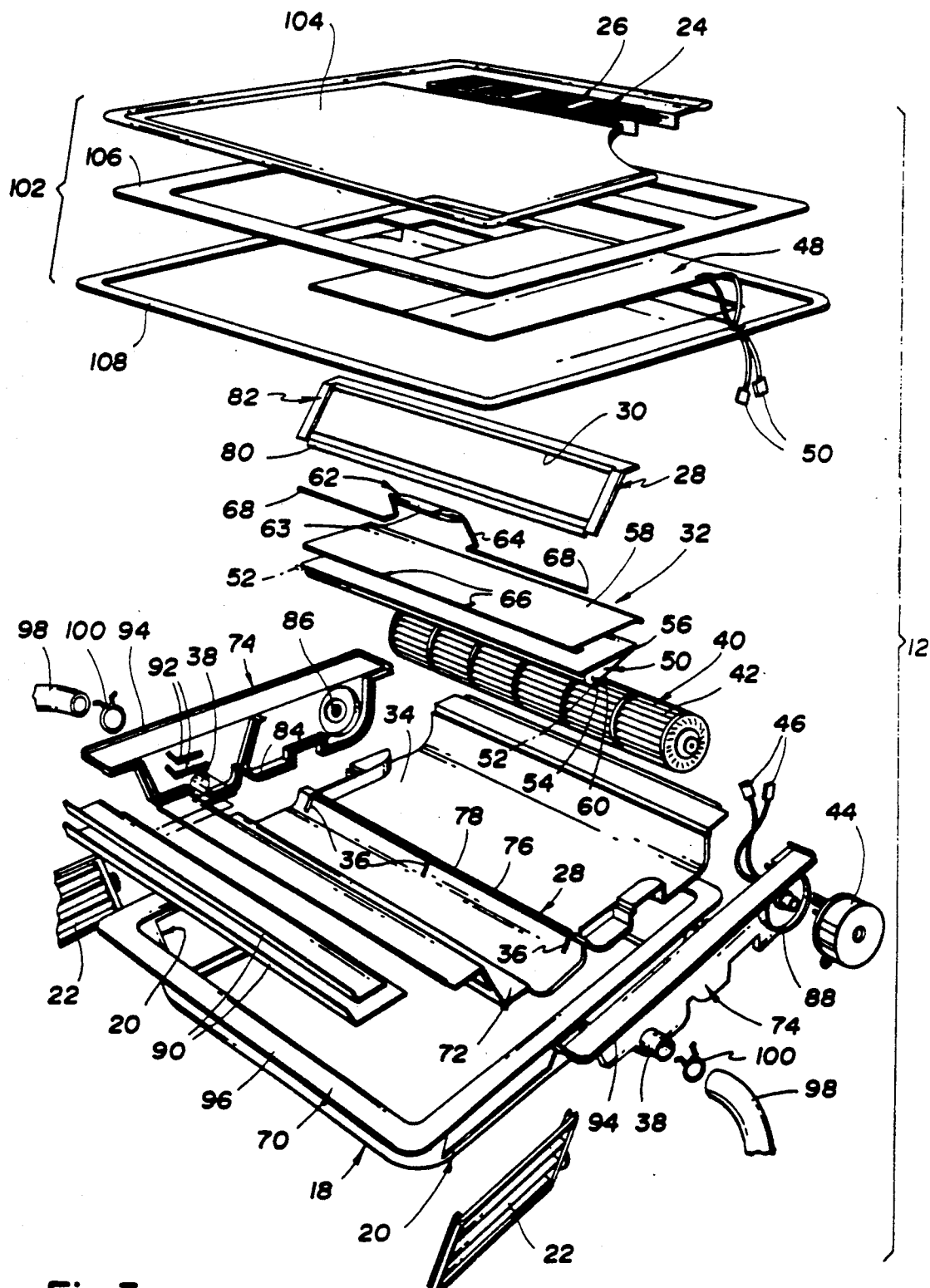
FIG. 3 is an exploded perspective view of the vent to further illustrate its components.

As illustrated in FIG. 3, the vent 12 also preferably includes a fan 40 for drawing air from the vehicle occupant compartment through the vent for exhaustion to the environment. This vent 40 is illustrated as including a squirrel cage rotor 42 and an electric motor 44 that rotates the rotor 42 upon being energized through electrical wire connectors 46. The vent also preferably includes a solar panel 48 having wire connectors 50 that connect to the wire connectors 46 of the fan motor 44 to rotate the rotor 42 and thereby energize the fan when the solar panel is exposed to the sunlight. A linear current booster and/or a temperature sensor may be incorporated to control the fan motor. The purpose of the linear current booster is to provide maximum operational power to the fan motor in all light conditions. The temperature sensor prevents fan operation until the vehicle interior has been heated to a predetermined temperature regardless of the amount of solar or other power available to operate the fan As illustrated by combined reference to FIGS. 2 and 3, the float valve 32 of the vent includes a buoyant valve body 50 and a lower pivotal connection 52 located below the upper opening 30 of the divider 28. The divider opening 30 is inclined from the horizontal at an angle just slightly less than 45° to provide good results in closing and opening of valve 32. The pivotal connection 52 pivotally mounts the buoyant valve body 50 on the housing for movement between the open and closed positions with respect to the divider opening 30 through which the air flows. The buoyant valve body 50 as best illustrated in FIG. 3 has an enlarged buoyant portion 54 adjacent the pivotal connection 52 and also has a smaller distal end 56 located at a remote location from the pivotal connection. A seal flap 58 of the buoyant valve body 50 has edges that provide a snap connection and has a flat shape that provides a flat side for sealing with the divider 28 in the closed position. A curved side 60 of the buoyant valve body cooperates with the flat side to define the enlarged buoyant portion 54 and the distal end 56 which is a construction that provides a buoyant force for maintaining the valve closed even when the water begins to drain from the collection chamber 34. Some water will also move by capillarity between the divider 28 and the buoyant valve body 50 in the closed position and thereby provides a capillarity seal closing the valve against further water movement. Furthermore, increased water in the collection chamber 34 will provide a greater closing force to the buoyant valve body 50 to thereby prevent leakage of the valve 32.

As also shown by FIGS. 2 and 3, the float valve 32 includes an optional counterbalance 62 located on the opposite side of the pivotal connection 52 from the buoyant valve body 50 so as to thereby facilitate the movement of the buoyant valve body to the closed position. The counterbalance 62 includes a weight 63 and a wire support 64 on which the weight is mounted. The wire support 64 extends through slots 66 in the seal flap 58 so as to be captured against the buoyant valve body 50 and thereby secured in position. Wire 64 also has opposite ends 68 that extend outwardly to be received within associated holes in the vent housing 18 in order to provide the pivotal connections 52 upon assembly.

As illustrated in FIG. 3, the vent 12 is shown as having its housing 18 provided with an interior console 70, a main tray 72, and side members 74. The console 70 has openings that define the inlets 20 and receive the inlet grills 22 at the opposite sides of the vent. The tray 72 has an upwardly extending portion 76 with a central slot 78 that receives a lower flange 80 of a divider member 82 to cooperate therewith in providing the divider 28. As illustrated, the upwardly extending portion 76 of the tray has three drain passages 36 provided therethrough to permit the limited flow of the water through the divider even when the float valve is closed.

With continuing reference to FIG. 3, the side members 74 each have a peripheral groove 84 for receiving the adjacent edge of the tray 72 and the adjacent end of the divider member 82 upon assembly. Each side member also has a journal 86 for rotatably supporting the adjacent end of the fan rotor 42, while one of the side members also has a mount 88 for supporting the electric motor 44. A pair of louvers 90 are also illustrated as being components of the vent and have opposite ends that are received by grooves 92 of the side members 74 to provide a tortuous path through which the air flows through the vent and thereby prevent any water from splashing into the vehicle occupant compartment through the inlet grills 22. Each of the side members 74 has a flange 94, and the console 70 has a flange 96. These flanges 94 and 96 facilitate the mounting of the vent on the vehicle roof as well cooperating in the assembly of the vent as is hereinafter described. Drains 38 are also provided on the side members 74 and are connected to associated hoses 98 by clips 100 to provide a passage for the water to flow to the ground through the vehicle such as along or within a vehicle pillar or another vehicle component.

With continuing reference to FIG. 3, the vent 12 also has an upper cap assembly 102 which includes a glass panel 104 that mounts the outlet grill 26, a gasket 106, the solar panel 48 previously described, and a peripheral cap housing 108 that rests on the flange 96 of the console 70 upon assembly.

Figure 4:
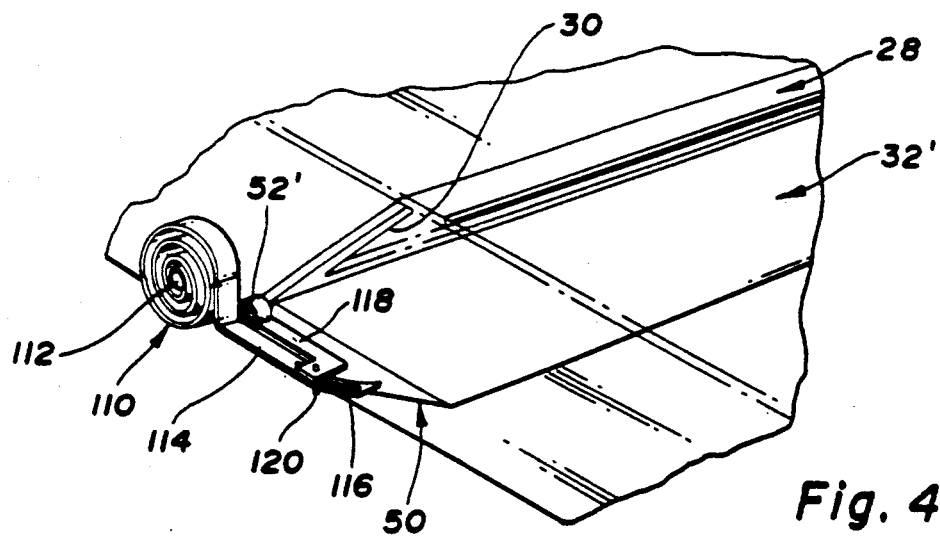
FIG. 4 is a partial perspective view of a modified embodiment wherein a float valve of the vent has a thermally responsive spring and is illustrated as positioning the valve in an open position.
Figure 5:
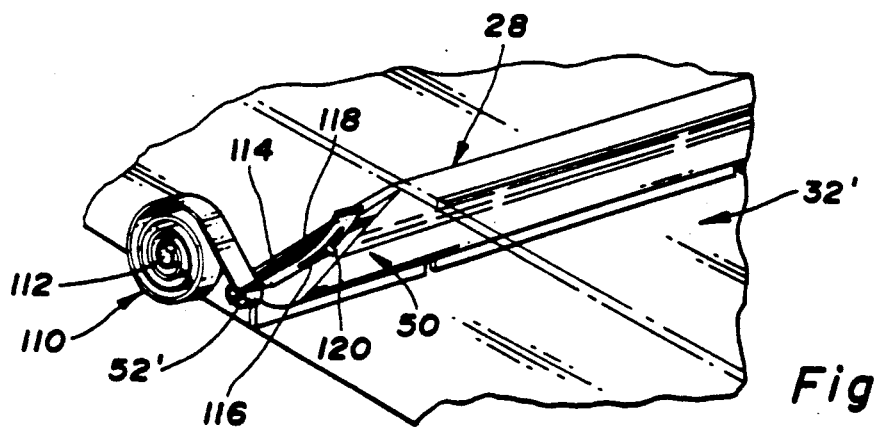
FIG. 5 is a view similar to FIG. 4 but showing the float valve positioned by the thermally responsive spring in a closed position.

With reference to FIGS. 4 and 5, a modified embodiment of the float valve 32' includes a thermally responsive spring 110 of the bimetallic type, which has a spiral configuration whose center is secured to a support 112 and whose outer end has a leg 114 including a longitudinal slot 116. The buoyant valve body 50 of this embodiment has its pivotal connection 52' provided with a radially extending leg 118 including a pin 120 that is received by the slot 116 of the spring leg 114. At relatively high temperatures, the thermally responsive spring 110 has its leg 114 positioned as shown in FIG. 4 so that the buoyant valve body 50 remains open. At cooler temperatures such as below about 75° Fahrenheit, the thermally responsive spring 110 positions its leg 114 as shown in FIG. 5 so that the buoyant valve body 50 is pivoted to a closed position with respect to the divider 28 and thereby prevents air from entering or exiting the vehicle occupant compartment through the vent. As such, when the vehicle is in a heating mode, the heated air will not be lost to the environment through the vent 12. Furthermore, even at higher temperatures when the thermally responsive spring 110 positions its leg 114 to maintain the buoyant valve body 50 open, moisture accumulation within the collection chamber will float the buoyant valve body upwardly as the pin 116 moves out of the leg slot 116 such that the valve 32' is then closed. After the collected water drains from the vent as previously described, the valve body 50 pivots downwardly to again open as the leg pin 120 thereof is inserted back into the slot 116 of the thermally responsive spring 110.

Figure 6:
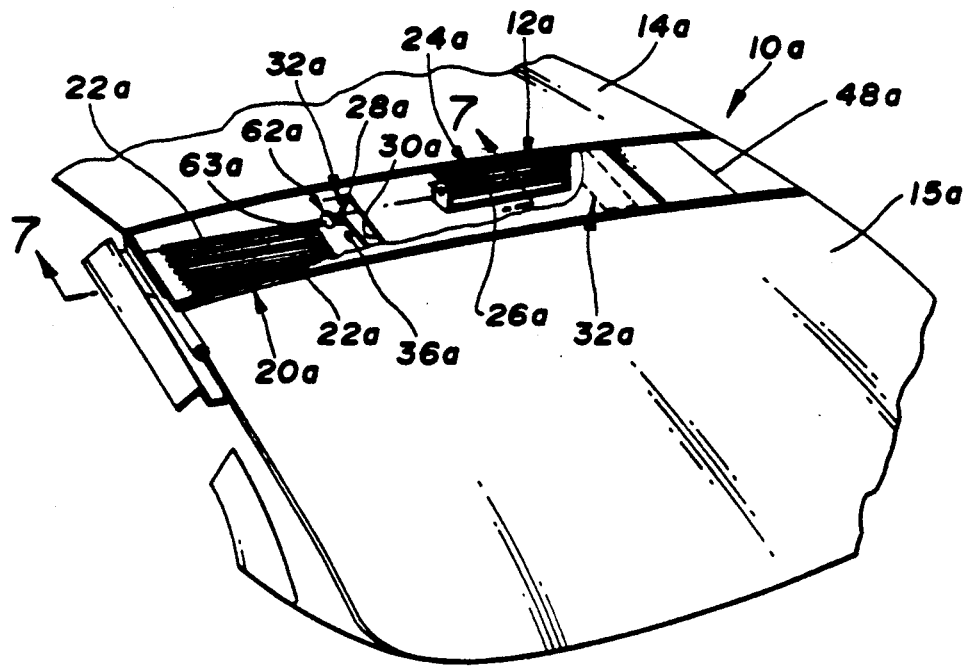
FIG. 6 is a view of a further embodiment that illustrates the vent located just forwardly from a vehicle back window at the rear of the vehicle roof.
Figure 7:
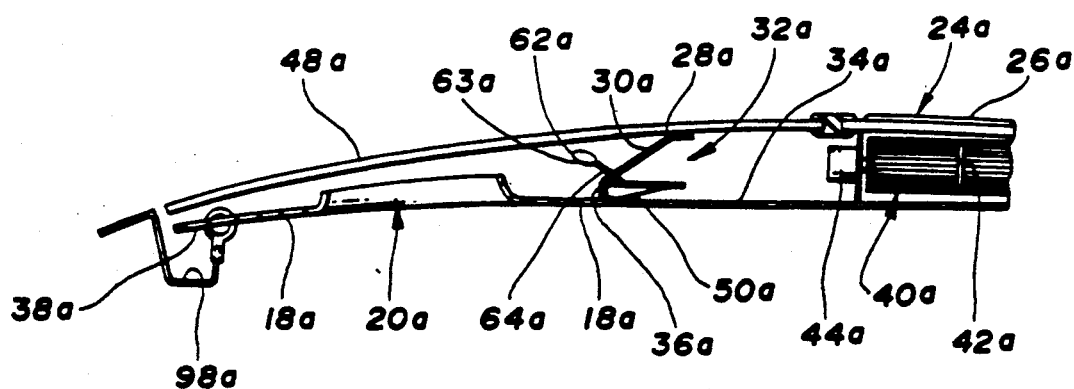
FIG. 7 is a half-sectional view taken along the direction of line 7—7 in FIG. 6 to illustrate the vent construction.

With reference to FIGS. 6 and 7, a partially indicated vehicle 10a has a roof 14a and a back window 15a. A modified embodiment of the vehicle vent 12a is supported between the vehicle roof 14a and the back window 15a at a central location. At each of its lateral sides, the vent has an inlet 20a provided by an inlet grill 22a of upwardly formed openings in a sheet metal housing 18a located below a solar panel 48a. An outlet 24a of this embodiment is provided by an outlet grill 26a located just above a fan 40a that includes a squirrel cage rotor 42a like the previously described embodiment. On each side of the outlet 24a, the vent 12a as shown in FIG. 6 has an associated float valve 32a of generally the same construction as the float valve previously described. More specifically, a divider 28a having an opening 30a as shown in FIG. 7 extends at an inclined orientation between the housing member 18a and the upper solar panel 48a utilized to energize the fan 40a by driving a motor 44a at one end of the rotor 42a. On the inward side of the divider 28a toward the outlet 24a, a collection chamber 34a is defined for the accumulation of water that enters the vent through the outlet. Any accumulated water thus controls opening and closing of the valve 32a by floating of the buoyant valve body 50a in the same manner previously described, which may utilize the assistance of the optional counterbalance 62a. A certain amount of water will pass through the lower drain passage 36a at the lower end of the divider 28a and drains between the openings of the grill 22a to the outboard end of the housing 18a which functions as a drain 38a that empties into a drainage trough 98a of the vehicle body for passage to the ground.

Figure 8:
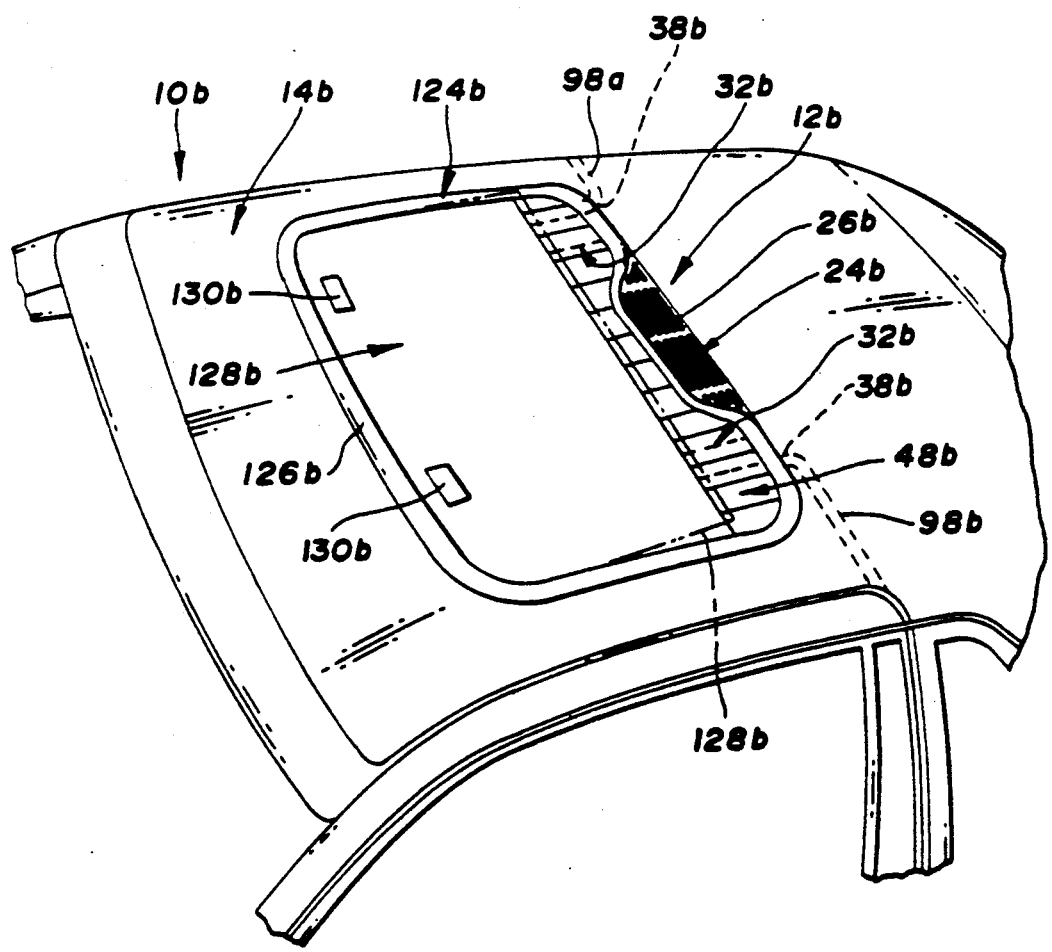
FIG. 8 is a partial perspective view of a further embodiment wherein the vent is a component of a vehicle sunroof.

With reference to FIG. 8, another embodiment of the vent 12b is illustrated as being mounted on a vehicle 10b at the roof 14b thereof as part of a sunroof 124b. This sunroof 124b has a peripheral flange 126b that provides mounting thereof on the vehicle roof 14b and has a movable glass panel 128b that pivots about hinges 130b between the lower position shown by solid line representation and the upper position shown by phantom line representation where its rear edge is positioned above the vehicle roof in order to provide venting. Within the peripheral flange 126b, the sunroof includes a fixed glass panel covering a solor panel 48b that energizes a motor for running a fan located below the outlet 24b with the same construction as the embodiment of FIGS. 6 and 7. At each side of the outlet 24b below the solor panel 48b, the vent 12b has an associated valve 32b of the same construction as the embodiment of FIGS. 6 and 7 so as to prevent water that enters the vehicle through the outlet from entering the vehicle occupant compartment. Rather, such water is permitted to drain through each valve 32b and from there to pass to a drain 38b for flow to a drain hose 98a at a limited rate in the same manner previously described with the other embodiments. Otherwise, the operation of the sunroof embodiment of the vent is the same a the previously described embodiments and thus will not be repeated.

Also, the vehicle side door mirror 130 shown in FIG. 1 has a lower vent opening that is communicated by a conduit 132 within the door to introduce air into the vehicle adjacent the vehicle floor. Cooler air adjacent the floor is thus moved upwardly to replace the hotter air drawn out adjacent the vehicle roof by the vehicle vent of this invention.

While the best modes for carrying out the invention have been described in detail, other embodiments and ways for carrying out the invention will be apparent to those skilled in this art as defined by the following claims.

What is claimed is:

1. A vehicle vent for exhausting air from a vehicle occupant compartment to the environment, the vent comprising: a housing having an inlet through which air enters the vent from the vehicle occupant compartment and also having an outlet through which the air exits from the vent to the environment; the housing having a divider that defines an upper opening through which the air flows from the inlet to the outlet; a float valve movable between open and closed positions with respect to the upper opening of the divider; the housing defining a collection chamber located toward the outlet from the divider such that water entering the vent from the environment accumulates in the collection chamber to close the float valve; the housing having at least one lower drain passage that extends from the collection chamber through the divider to a location toward the inlet from the divider such that water can flow therethrough at a limited rate even when the float valve is closed; and the housing having a drain located on the side of the divider toward the inlet so as to receive water from the drain passage for draining from the vent to the ground.

2. A vehicle vent as in claim 1 further including a fan for drawing air from the vehicle occupant compartment through the vent for exhaustion to the environment.

3. A vehicle vent as in claim 2 further including a solar panel for energizing the fan.

4. A vehicle vent as in any one of claims 1 through 3 wherein the float valve includes a buoyant valve body and a lower pivotal connection that pivotally mounts the buoyant valve body on the housing for movement between the open and closed positions with respect to the divider opening through which the air flows.

5. A vehicle vent as in claim 4 wherein the buoyant valve body has an enlarged buoyant portion adjacent the pivotal connection and also has a smaller distal end.

6. A vehicle vent as in claim 5 wherein the buoyant valve body has a flat side that seals with the divider and a curved side that cooperates with the flat side to define the enlarged buoyant portion and the smaller distal end.

7. A vehicle vent as in claim 4 wherein the float valve also includes a counterbalance located on the opposite side of the pivotal connection from the buoyant valve body.

8. A vehicle vent as in claim 4 wherein the float valve also includes a thermally responsive spring that maintains the float valve body in the closed position at lower temperatures.

9. A vehicle vent as in claim 1, 2 or 3 wherein the housing includes a peripheral flange for mounting the vent on a vehicle roof.

10. A vehicle vent as in claim 1, 2 or 3 wherein the housing is mounted on a vehicle roof, and the vent further including a solar panel.

11. A vehicle vent as in claim 10 wherein the solar panel is located just forwardly of a vehicle back window.

12. A vehicle vent as in claim 10 wherein the solar panel is a component of a vehicle sunroof.

13. A vehicle vent for exhausting air from a vehicle occupant compartment to the environment, the vent comprising: a housing having an inlet through which air enters the vent from the vehicle occupant compartment and also having an outlet through which the air exits from the vent to the environment; the housing having a divider that defines an upper opening through which the air flows from the inlet to the outlet; a float valve including a buoyant valve body and a lower pivotal connection that pivotal mounts the buoyant valve body on the housing for movement between open and closed positions with respect to the upper opening of the divider; the housing defining a collection chamber located toward the outlet from the divider such that water entering the vent from the environment accumulates in the collection chamber to close the float valve; the housing having at least one lower drain passage that extends from the collection chamber through the divider to a location toward the inlet from the divider such that water can flow therethrough at a limited rate even when the float valve is closed; the housing having a drain located on the side of the divider toward the inlet so as to receive water from the drain passage for draining from the vent to the ground; and a fan for drawing air from the vehicle occupant compartment through the vent for exhaustion to the environment.

14. A vehicle vent for exhausting air from a vehicle occupant compartment to the environment, the vent comprising: a housing having an inlet through which air enters the vent from the vehicle occupant compartment and also having an outlet through which the air exits from the vent to the environment; the housing having a divider that defines an upper opening through which the air flows from the inlet to the outlet; a float valve including a buoyant valve body and lower pivotal connection that pivotal mounts the buoyant valve body on the housing for movement between open and closed positions with respect to the upper opening of the divider; the housing defining a collection chamber located toward the outlet from the divider such that water entering the vent from the environment accumulates in the collection chamber to close the float valve; the housing having at least one lower drain passage that extends from the collection chamber through the divider to a location toward the inlet from the divider such that water can flow therethrough at a limited rate even when the float valve is closed; the housing having a drain located on the side of the divider toward the inlet so as to receive water from the drain passage for draining from the vent to the ground; a fan for drawing air from the vehicle occupant compartment through the vent for exhaustion to the environment; and a solar panel for energizing the fan.

* * * * *